3,759,860
COATING COMPOSITIONS AND COATED ARTICLES
Charles R. Peaker, Naugatuck, Conn., assignor to Uniroyal, Inc., New York, N.Y.
No Drawing. Original application Aug. 13, 1969, Ser. No. 849,876. Divided and this application June 19, 1972, Ser. No. 264,108
Int. Cl. C08d 7/10; C08f 45/56, 45/60
U.S. Cl. 260—29.7 SQ    14 Claims

ABSTRACT OF THE DISCLOSURE

Coating compositions for textiles, which compositions comprise a stabilized latex containing an alkyl sulfone terminated oligomeric emulsifier.

---

This is a division of application Ser. No. 849,876, filed Aug. 13, 1969.

BACKGROUND OF THE INVENTION

(1) Field of the invention

This invention relates to a new and improved latex coating composition for coating textile articles, such as carpets, to a process of applying these compositions to the textiles and to coated articles formed by this process.

(2) Description of the prior art

Conventionally textile fabrics are coated or "backed" with latex in order to provide skid resistance or, in the case of tufted fabric, to lock the tufts in position. Several factors affect the suitability of a given latex for this use. One of the most important requirements is that the penetration of the latex into the textile fabric be minimal. The less the latex impregnates the fabric, the less latex per unit area. This in turn means there is less water to be evaporated in drying of the coated textile, and hence greater processing speed.

Where the latex is employed to bond two materials together, as in secondary backed carpets, another important quality of the coating composition is good "quick-set" behavior, i.e., the property of rapidly developing considerable adhesive strength between the plies even while the latex still contains a relatively large amount of water. This property, while common in natural rubber latex, is difficult to achieve with conventional synthetic rubber latexes.

A third important property of the latex coating composition is its ability to accept filler in amounts great enough to significantly reduce the cost of the composition, without foaming.

SUMMARY OF THE INVENTION

I have discovered a new latex coating composition for textile fabrics having not only superior "quick-set" and penetration properties, but also the ability to accept large amounts of filler directly and without foaming.

More specifically, I have found that these improved properties can be obtained by forming the latex by emulsion polymerization using an alkyl sulfone or alkyl sulfoxide terminated oligomeric emulsifier. These oligomers have a backbone of from 4 to 100 carbon atoms in addition to those of the alkyl group. Attached to the oligomeric carbon atoms are appendant polar groups with at least one polar group being present for each two carbon atoms in the chain. The oligomers are usually water soluble, either by themselves or as the alkaline salts, and have a narrow molecular weight distribution, e.g., the polydispersity index always is less than 2 and frequently is as low as 1.4 to 1.5, as determined by Gel Permeation Chromatography.

The latex thus formed may be used to coat various textile fabric articles and is especially useful as a coating for tufted carpets.

DESCRIPTION OF THE PREFERRED EMBODIMENTS

The latex coating composition of my invention may be prepared using polymers formed from the emulsion polymerization of a wide variety of compounds, such as, e.g., vinyl, i.e., copolymerizable mono-ethylenically unsaturated compounds, and/or conjugated diolefinic monomers. Among the suitable conjugated diolefin polymers and copolymers are butadiene, butadiene-styrene, butadiene-acrylonitrile, butadiene-vinylidene chloride, and butadiene-methacrylonitrile. Vinyl-type polymers and copolymers suitable for use in my invention are styrene-acrylonitrile, styrene-methacrylonitrile, ethyl acrylate, ethyl acrylate-vinyl acetate, ethyl acrylate-methyl methacrylate, ethyl acrylate-styrene, ethyl acrylate-butyl acrylate, butyl acrylate-acrylontrile, and the like.

The addition polymers produced by the emulsion polymerization may be of the rubber or plastic type, and consequently their emulsions could be termed rubber latex or plastic latex.

Rubber may be defined as a material that is capable of recovering from large deformations quickly and forcibly, and which can be (or already has been) modified to a state in which it is essentially insoluble (but can swell) in a boiling solvent such as benzene, methyl ethyl ketone and ethanol/toluene azeotrope or the like.

Rubber in its modified state, free of diluents, retracts within one minute to less than 1.5 times its original length after being stretched at room temperature (20–27° C.) to twice its length and held for one minute before release.

Plastic may be defined as a material that contains as an essential ingredient an organic substance of large molecular weight, is solid in its finished state, but at some stage in its manufacture or in its processing into finished articles can be shaped by flow.

Particularly preferred polymers of the instant invention are the carboxylated conjugated diolefin type. These include butadiene-styrene or butadiene-acrylonitrile with itaconic acid, acrylic acid, methacrylic acid, maleic acid, fumaric acid, cinnamic acid, vinylacrylic acid, ethacrylic acid, 2-ethyl-3-propylacrylic acid, beta-acryloxy-propionic acid and sorbic acid.

The relative amounts of the aforesaid monomers vary widely and are well known to those skilled in the art. In the case of the carboxylated butadiene-styrene latexes the amount of polymerized butadiene and styrene varies from 30 to 70% by weight based on the total weight of latex and the amount of the carboxyl component generally ranges from 0.5 to 5% of the total polymerized monomers.

Emulsifiers used to prepare coating composition of the present invention are alkyl sulfone or alkyl sulfoxide terminated oligomers having a backbone of from 4 to 100 carbon atoms in addition to those of the alkyl group. Attached to the oligomeric carbon atoms are appendant polar groups. At least one polar group is present for each two carbon atoms in the chain. The oligomers are generally water soluble, either by themselves or as the corresponding alkaline salts.

The method of preparing these oligomers results in a product having a very narrow molecular weight distribution. Thus, the polydispersity index, $M_w/M_n$, is always less than 2 and frequently as low as 1.4 to 1.5, as determined by the Gel Permeation Chromatography. The molecular weight of the oligomers should be less than 5000, preferably less than 2000, but higher than 200.

Such oligomers are soluble in water or are readily made soluble in water by conversion to salts, as by reaction with the appropriate metal oxide, metal hydroxide, ammonium hydroxide, amine, etc. While the ammonium, substituted ammonium, and alkali metal salts are broadly soluble, the alkaline earth metal and Group III heavy metal salts may also be soluble, particularly in the case of the oligomers having two strongly hydrophilic groups.

Salts of particular interest are those of sodium, potassium, ammonium, calcium, zinc, magnesium, barium, and the lower alkyl and alkanol substituted amines such as, e.g., monoethanolamine. One skilled in the art may readily determine which of the oligomers and which of their salts are water soluble.

Generically, the oligomers may be represented by the Formula I:

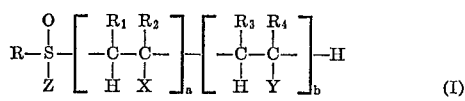 (I)

As noted, it is to be understood that the foregoing formula is not intended to depict the actual structure of the final compounds, inasmuch as the structural units

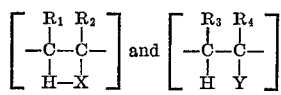

are randomly distributed in the molecule.

In the above Generic Formula I, R is an alkyl group and may be a straight chain primary (normal), branched chain primary, secondary or tertiary alkyl group having from 5 to 20 carbon atoms, and preferably 6 to 12 carbon atoms, or mixtures thereof; Z is oxygen or nothing; (where Z is nothing, then the oligomer is alkyl-sulfoxide terminated; where Z is oxygen, then the oligomer is alkyl-sulfone terminated); $R_1$ and $R_3$ may each be hydrogen, methyl, ethyl or —COOH groups; $R_2$ and $R_4$ may each be hydrogen, methyl, ethyl, —COOH or —CH$_2$COOH groups; Y is a strongly hydrophilic group such as —COOH, —CONH$_2$, —OCH$_3$, —OC$_2$H$_5$, —CH$_2$OH, or

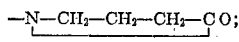

and X is either one of the aforesaid strong hydrophilic groups or is a less hydrophilic group such as —COOC$_2$H$_4$OH,
—COOC$_3$H$_6$OH,
—CONHCH$_2$OH,
—CONHCH$_3$,
—CONHC$_2$H$_5$,
—CONHC$_3$H$_7$,
—COOCH$_3$,
—COOC$_2$H$_5$,
—CN,
—OOCCH$_3$,
—OOCC$_2$H$_5$, or

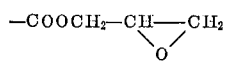

There must always be at least one strongly hydrophilic group, Y, present, but there need not be a less hydrophilic group, X.

The degree of polymerization, $a+b$, should be between about 2 and 50, and preferably between about 3 and 30. The mole fraction of the monomer having the X functional group, $a/(a+b)$, may vary from 0 to less than 1 unless X is a less hydrophilic group, in which case the mole fraction must be less than 0.6, and preferably less than 0.55. The ratio of $a$ to $b$ may be varied as desired by those skilled in the art, depending, most importantly, on the desired water solubility of the oligomer or its salts. For example, where the less hydrophilic group is either —CN or —CONHCH$_2$OH, the mole fraction is most desirably from 0.3 to 0.5. On the other hand, where one of the other less hydrophilic groups is present, the preferred mole fraction is less than 0.3. A particularly preferred class of oligomers which are useful as emulsifiers has the Formula II:

 (II)

wherein R is an alkyl group having from about 6 to 12 carbon atoms, preferably a normal alkyl group having from about 7 to 11 carbon atoms, and most desirably from about 8 to 10 carbon atoms; $R_1$ is either hydrogen or methyl; and $b$ the degree of polymerization, is about 2 to 50, preferably from about 2 to 30, and most preferably from about 3 to 10. For use as an emulsifier, this class of oligomers may be used wherein only a small percent of the acid groups have been neutralized, as with ammonia, substituted ammonium compounds or alkali metal hydroxides.

Another preferred class of oligomers has the Formula III.

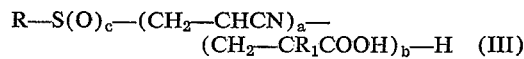 (III)

wherein R is a primary or secondary alkyl group having from about 6 to 12 carbon atoms, preferably a normal alkyl group having from about 7 to 11 carbon atoms, and most desirably, from about 8 to 10 carbon atoms; $c$ is an integer, and is either one or two; $R_1$ is either hydrogen or methyl; $a+b$, the degree of polymerization, is from about 4 to 50, preferably from about 12 to 30; and $a/(a+b)$ is 0 to 0.6 and preferably 0.2 to 0.55. For use as an emulsifier, this class of oligomers may be converted to the water soluble salt, e.g., ammonium or alkali metal salt.

A further preferred class of oligomers has the Formula IV:

 (IV)

where R is a primary or secondary alkyl group, preferably a normal alkyl group having from about 6 to 20 carbon atoms, and most preferably from about 7 to 12 carbon atoms; $R_1$ is either hydrogen, methyl or

$R_2$ is hydrogen or methyl; $a+b$, the degree of polymerization, is about 6 to 50, and preferably from about 12 to 30; and $a/(a+b)$ is from about 0.075 to 0.40, and preferably from about 0.075 to 0.30. When a monofunctional acid is present the upper portions of the ranges are preferred, while for a difunctional acid the lower portions are preferred. Since this class of oligomers is water soluble, they may be used in their acid form or may be converted into their water soluble salts as previously described.

Oligomers suitable for use in my invention are prepared by the addition polymerization of appropriate monomers in the presence of alkyl mercaptans, and this is followed by oxidation, as with hydrogen peroxide or ozone. Use of hydrogen peroxide or ozone as the oxidizing agent is preferred because they form no acid or salt by-products, which by-products might possibly have an adverse effect on latex properties and ultimate product performance. The use of potassium persulfate would form sulfates, while halogens would be converted to halides.

Typical examples of such oligomers include the following:

| | | (a+b) | a/(a+b) |
|---|---|---|---|
| (1) | n-C$_8$H$_{17}$S(O)—[CH$_2$—CH(COOH)—]$_3$H 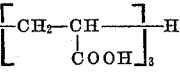 | 3 | 0 |
| (2) | n-C$_8$H$_{17}$S(O)$_2$—[CH$_2$—CH(COOH)—]$_3$H 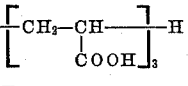 | 3 | 0 |
| (3) | n-C$_8$H$_{17}$S(O)—[CH$_2$—CH(COOH)—]$_4$H 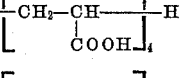 | 4 | 0 |
| (4) | n-C$_8$H$_{17}$S(O)—[CH$_2$—CH(COOH)—]$_6$H 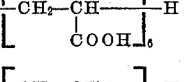 | 6 | 0 |
| (5) | n-C$_8$H$_{17}$S(O)—[CH$_2$—CH(COOH)—]$_{10}$H 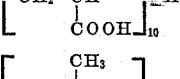 | 10 | 0 |
| (6) | n-C$_8$H$_{17}$S(O)—[CH$_2$—C(CH$_3$)(COOH)—]$_3$H 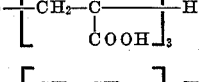 | 3 | 0 |
| (7) | p-C$_8$H$_{17}$S(O)—[CH$_2$—CH(COOH)—]$_3$H 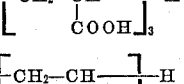 | 3 | 0 |
| (8) | t-C$_8$H$_{17}$S(O)—[CH$_2$—CH(COOH)—]$_3$H 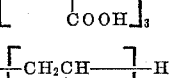 | 3 | 0 |
| (9) | n-C$_{10}$H$_{21}$S(O)—[CH$_2$CH(COOH)—]$_3$H 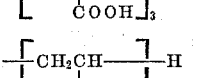 | 3 | 0 |
| (10) | n-C$_{12}$H$_{25}$S(O)—[CH$_2$CH(COOH)—]$_3$H 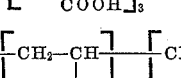 | 3 | 0 |
| (11) | n-C$_8$H$_{17}$S(O)—[CH$_2$—CH(CN)—]$_8$[CH$_2$—CH(COOH)—]$_8$H 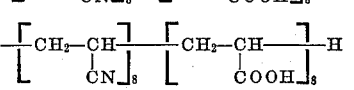 | 16 | 0.50 |
| (12) | n-C$_8$H$_{17}$S(O)$_2$—[CH$_2$—CH(CN)—]$_8$[CH$_2$—CH(COOH)—]$_8$H 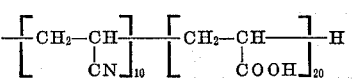 | 16 | 0.50 |
| (13) | n-C$_{10}$H$_{21}$S(O)—[CH$_2$—CH(CN)—]$_{10}$[CH$_2$—CH(COOH)—]$_{20}$H 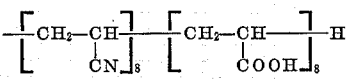 | 30 | 0.33 |
| (14) | n-C$_{10}$H$_{21}$S(O)—[CH$_2$—CH(CN)—]$_8$[CH$_2$—CH(COOH)—]$_8$H 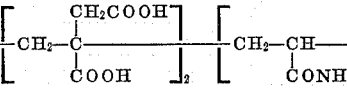 | 16 | 0.50 |
| (15) | n-C$_8$H$_{17}$S(O)—[CH$_2$—C(CH$_2$COOH)(COOH)—]$_2$[CH$_2$—CH(CONH$_2$)—]$_{18}$H 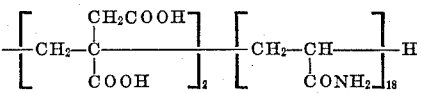 | 20 | 0.10 |
| (16) | n-C$_{12}$H$_{25}$S(O)—[CH$_2$—C(CH$_2$COOH)(COOH)—]$_2$[CH$_2$—CH(CONH$_2$)—]$_{18}$H 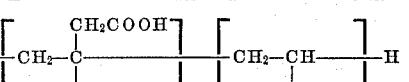 | 20 | 0.10 |
| (17) | n-C$_8$H$_{17}$S(O)—[CH$_2$—C(CH$_2$COOH)(COOH)—]$_4$[CH$_2$—CH(CONH$_2$)—]$_{16}$H 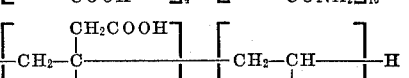 | 20 | 0.20 |
| (18) | n-C$_8$H$_{17}$S(O)—[CH$_2$—C(CH$_2$COOH)(COOH)—]$_4$[CH$_2$—CH(CONH$_2$)—]$_{36}$H 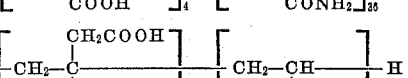 | 40 | 0.10 |
| (19) | t-C$_8$H$_{17}$S(O)—[CH$_2$—C(CH$_2$COOH)(COOH)—]$_2$[CH$_2$—CH(CONH$_2$)—]$_{18}$H 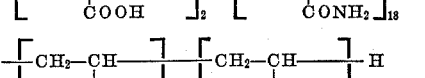 | 20 | 0.10 |
| (20) | n-C$_8$H$_{17}$S(O)—[CH$_2$—CH(COOH)—]$_4$[CH$_2$—CH(CONH$_2$)—]$_{16}$H 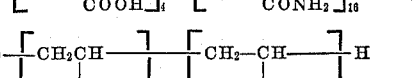 | 20 | 0.20 |
| (21) | n-C$_{12}$H$_{25}$S(O)—[CH$_2$CH(COOH)—]$_4$[CH$_2$—CH(CONH$_2$)—]$_{16}$H 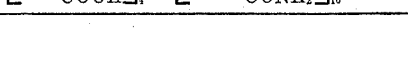 | 20 | 0.20 |

Thus, suitable monomers used in preparing these oligomers include acrylic acid, acrylonitrile, acrylamide, itaconic acid, methacrylic acid, methacrylamide, and the like, as well as mixtures thereof.

As previously noted, the oligomers may be prepared by the addition polymerization of appropriate monomers in the presence of alkyl mercaptans, followed by oxidation with hydrogen peroxide or ozone. The addition polymerization results in an alkyl-sulfide terminated oligomer of the formula

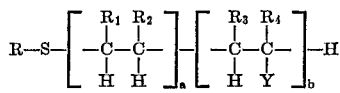

wherein R, $R_1$, $R_2$, $R_3$, $R_4$, X, Y, are as previously defined and $a$ and $b$ are integers, and can be characterized by the following equations:

$$a = \frac{\text{Moles of Polymerized Monomer containing X substituent}}{\text{Moles of Reacted Mercaptan}} \quad (1)$$

$$b = \frac{\text{Moles of Polymerized Monomer containing Y substituent}}{\text{Moles of Reacted Mercaptan}} \quad (2)$$

$$a + b = \frac{\text{Total Moles of Polymerized Monomer}}{\text{Moles of Reacted Mercaptan}} \quad (3)$$

$$\frac{a}{a+b} = \frac{\text{Moles of Polymerized Monomer containing X substituent}}{\text{Total Moles of Polymerized Monomer}} \quad (4)$$

The foregoing akyl-sulfide terminated oligomer is then oxidized to the corresponding sulfoxide or sulfone. Preferably oxidation is effected by the use of hydrogen peroxide or ozone as the oxidizing agent. When the sulfoxide is desired, then a mole equivalent of hydrogen peroxide or ozone is employed per mole equivalent to sulfur. When the sulfone is desired, two mole equivalents of the hydrogen peroxide or ozone are employed per mole equivalent of sulfur.

The oxidation is conveniently carried out at a temperature from about 30 to 90° C., and preferably from about 50 to 70° C. The reaction time may vary widely, e.g., from 1 hour to 24 hours. In general, the lower the temperature, the longer is the time required. Preferably the reaction time is from 1 to 2 hours.

Inasmuch as the alkyl-sulfide terminated oligomer is water soluble, either as is or as the alkali metal salt form, it is convenient to carry out the reaction with the oligomer in aqueous solution. The concentration of oligomer in the solution is desirably from about 10 to 50% by weight, and preferably from about 30 to 45% by weight.

When hydrogen peroxide is employed as the oxidizing agent, it is generally preferred to use an aqueous solution thereof. When ozone is employed as the oxidizing agent, it is usually advantageous to use an air-ozone stream.

The method of producing the sulfoxide-terminated and sulfone-terminated oligomers is further illustrated by the subsequent Examples I–III.

As regards the emulsion polymerization of the heretofore described systems, the emulsifier plays a key role, not only in the polymerization itself, but also in the finishing of the latex and in its resultant properties. Because of the need to use existing resources as efficiently as possible, the rate of polymerization is a most important factor. It is also highly desirable that the emulsifier form a latex that is (1) low in macroscopic discontinuities, sucht as grain, coagulum, or microfloc, which cause manufacturing difficulties and reduce product utility, (2) low in foaming, as this would tend to obviate the need for antifoaming agents, (3) of small particle size or low turbidity, inasmuch as this increases productivity and is also beneficial to ultimate use, (4) of low viscosity, since this makes for efficient transfer without hold-up losses, (5) of high latex solids concentration, since this increases productivity and decreases transportation costs, and (6) of good mechanical stability, for instance, giving low values in the S–1 test, since the latex must stand up against deterioration on storage, transport, compounding, and use. (In the S–1 test, the latex is stirred at a standard speed of 15,000 r.p.m. for 30 minutes, using a Hamilton Beach mixer. At the end of the stirring, the latex is filtered through 100 mesh screen and the retained coagulum dried and weighed. The S–1 mechanical stability of a latex is reported as percent of dry coagulum found during stirring, based on latex weights.)

The relative amounts of the heretofore mentioned monomers to be employed in the emulsion polymerization vary widely, the proportions being well known to those skilled in the art. In the case of the carboxylated butadiene-styrene latexes the amount of polymerized butadiene and styrene varies from about 40 to 60% by weight of latex (i.e., 40 to 60% polymeric solids) and the amount of carboxyl component generally ranges from about 0.5 to 5% of the total polymerized monomers.

The emulsion solution, i.e., the aqueous solution of the oligomer, which may or may not be partially or completely neutralized, contains 20 to 60% solids and has a surprisingly low viscosity, e.g., 1–10 cps. at 10 to 20% solids. Generally 100 parts by weight of monomer for each 4 or 5 parts of solids in the emulsifier solution are introduced at a temperature of about 50° C. and at a pressure of 35–45 p.s.i.g. These conditions are typical and may be varied within wide ranges according to known emulsion polymerization technology.

The range of typical emulsion polymerization recipes and reaction conditions are given in the following tabulation:

RANGE OF TYPICAL EMULSION POLYMERIZATION RECIPES AND REACTION CONDITIONS

| Component | Parts by weight of— | |
|---|---|---|
| | Broad | Preferred |
| Monomers | 100 | 100 |
| Water | 70–240 | 90–180 |
| Emulsifier | 2–8 | 2–6 |
| Modifier | 0–1.0 | 0–0.5 |
| Initiator | 0.2–2.0 | 0.3–1.5 |
| Electrolyte | 0–2.0 | 0–0.8 |
| Chelating agent | 0–0.1 | 0–0.07 |
| Reaction conditions: | | |
| Temperature, ° C | −25–100 | 30–70 |
| Time, hours | 100–200 | 15–36 |

The various modifiers, initiators, electrolytes and additives employed are conventional and are known to those skilled in the art. See e.g., Whitby, Synthetic Rubber, John Wiley & Sons, Inc., New York, 1954, pp. 244–283, the contents of which are herein incorporated by reference. As modifiers, aliphatic mercaptans are most commonly employed. Initiators include redox systems, which generate free radicals, with or without complexing agents, and variable valence metal ions. Common initiators are persulfates, peroxides, hydroperoxides, ferricyanides, peroxamines, and diazo compounds such as diazo bis(isobutyronitrile).

After about 95 to 100% conversion of monomer to polymer is achieved, the pH of the emulsion is increased to 8.5–9.5 with a base such as ammonium hydroxide. Any unreacted monomer may be driven off by bubbling steam through the system. This stripping operation is slow and difficult when latexes prepared with conventional emulsifiers are involved because of foaming, which impedes the distillation of monomers and water and requires foam traps and a distillation pot, only partly full, to avoid loss of latex by foam carry-over. By contrast, latexes prepared with the oligomeric emulsifiers of the present invention can be stripped rapidly from a nearly full pot without the use of a foam trap, since they exhibit little or no foaming. This behavior of the oligomeric emulsified latexes is of obvious significance. While anti-foaming agents can be used with conventional emulsifier latexes, these agents add to cost and may damage polymer properties by appearing in the polymer as a separate phase. Since stripping dilutes the latex, it is finally concentrated to about 50% solids. This operation, too, is greatly facilitated by the absence of foam in oligomeric emulsifier latexes and can be rapidly done by distilling off water from the latex in a distillation pot. Conventional emulsifier latexes can be only concentrated in an apparatus which exposes a thin film of the latex, such as a multiple disc concentrator, because of foamy characteristics of the latex.

After formation of the latex as heretofore described, a stabilizer is added thereto. Such stabilizers are particularly necessary to prevent flocculation of the polymer particles when large amounts of filler (e.g., 300 parts or more) are added.

Suitable stabilizers are those which do not substantially reduce the surface tension of the latex. The effect of the stabilizer on surface tension may be ascertained by forming a 1% aqueous solution thereof. If the aqueous solution has a surface tension greater than 50 dynes/cm. the stabilizer will not substantially reduce the surface tension of the latex. These stabilizers serve to assist the wetting out and dispersion of the filler and are present in from 0.2 to 10 parts, preferably 0.4 to 5 parts, per hundred parts of latex (dry weight basis). Greater amounts of stabilizer may be used, but this will adversely affect the "quick set," washability and adhesivity of the coating composition.

Examples of suitable stabilizers are alkali metal polyphosphates, e.g., tetrasodium pyrophosphate, tetrapotassium pyrophosphate and sodium hexametaphosphate; alkali metal metasilicates, e.g. sodium metasilicate; condensation products of formaldehyde with napthalene sulfonic acid, e.g., Daxad 11 and 15 (Dewey and Almy Chem. Co.) and Darvan #1 (R. T. Vanderbilt Co.); and, though not as effective as the aforesaid compounds, the alkali metal salts of carboxylated polyelectrolytes, e.g., Tamol 731 (Rohm and Haas Co.) and Darvan #7 (R. T. Vanderbilt Co.). The aforesaid stabilizers do not interfere with the control of the penetration properties of the coating composition.

Many conventional stabilizers, unexpectedly, are either incompatible with the latex, or do not prevent its flocculation by large amounts of filler. Specifically, those which cause destabilization are Triton X–405 (octyl phenoxy polyethxy ethanol) and Triton X–202 (sodium salt of alkyl aryl polyether sulfate). Those which do not assist stability towards filler addition are Nacconol NRSF, Nacconol 90F, Ultrawet DS (alkyl aryl sulfonates), Aquarex WAQ (sodium alkyl sulfate), Tergitol 7 (sodium sulfate derivative of 3,9-diethyl-tridecanol-6) and Emulfor ON–870 (polyoxyethylated fatty alcohol).

Surface active agents, such as these may be added to the stabilized coating compositions containing filler in order to achieve the exact penetration (surface tension) desired for use in the coating operation.

Dry fillers, which serve to add weight to the article to be coated and reduce compound cost, may be added directly to the latex. Where the composition is used for carpet backing, from 100 to 1000 parts per hundred parts of latex (dry weight basis), preferably from 200 to 400 parts are present. For other applications from trace amounts to 2,500 parts may be present. The addition of the filler dry rather than in aqueous dispersion avoids diluting the coating composition and permits the maintenance of a high solids concentration.

Suitable fillers include calcium carbonates, ranging from ground crude limestone to products purified by various flotation or water treatments; kaolinite type clays, which may be similarly treated, with removal of iron salts, etc.; and barytes (barium sulfate). Carbonate fillers are the most common, but, if a stiffer "hand" is required, clay or a mixture of the two fillers is used. Sometimes small amounts of color pigments may be added to give whiter color (titanium dioxide), gray color (carbon black), or tan color (iron oxides).

A thickener, usually an aqueous solution of a sodium polyacrylate, is also added to the composition in amounts between 1.0 and 2.0 parts per hundred of latex solids to control viscosity of the compound for application. Other high molecular weight, water soluble polymers may be used.

Inasmuch as the coating composition has a high surface tension, defoamers which were almost always needed with prior latex compositions, particularly with latexes having low surface tension (e.g., 45 dynes/cm. or less), are not required.

In applying the latex coating compound to a carpet, it is necessary to maintain a balance between the properties of the latex compound and the mechanical operation of the coater. In general, it is desirable to control the degree of the penetration so that sufficient latex is deposited to give adequate tuft lock, or adequate adhesion to the secondary backing, with the minimum consumption of the coating composition. In practice this is done by (1) maintaining high solids in the coating composition, (2) using a composition of relatively high voscosity, (3) avoiding or keeping to a minimum additional wetting agents, (4) adjusting roll speeds and direction, and tension of the carpet over the roll, and (5) scraping or "doctoring" excess material off the backing. The coating composition of the invention is particularly outstanding in that the first three of the aforesaid criteria may be readily satisfied.

Since the coating composition of the invention has a high surface tension, which may be precisely adjusted where an absorptive yarn or a relatively open mesh fabric backing is being used, control of penetration need not depend solely on increasing viscosity, adjustment of roll speeds and direction, tensioning of the carpet and doctoring off the excess. These latter criteria are extremely sensitive and minor variations can result in the deposition of too much or too little latex. Too little results in an improperly bonded carpet and excessive amounts require the evaporation of more water and slower operating speeds.

In some types of carpet dryers, notably the so-called Dalton three-pass dryer, where the lamination is made by coating the carpet, laminating the secondary jute, and passing through the dryer with the face yarns or "pile" down, poor "quick set" properties may allow the carpet to separate from the secondary jute either prior to, or at the point of, making the first turn to go back through the dryer. This difficulty is substantially eliminated by using the coating composition of the invention.

Drying is done under tension on tenter frames. Usually dryers operate at temperatures of 260–400° F., with circulating air being blown over the carpet. Lower temperatures are used for certain fibers such as polypropylene, which may become distorted with heat and flattened by rolls. Drying times may range up to 15–20 minutes; but this is dependent on the type of oven, temperature, amount of water being evaporated, and the construction of the carpet (high pile vs. low pile).

The following examples will further illustrate my invention. Unless otherwise indicated, all parts are by weight.

EXAMPLE I

Low molecular weight polymers (i.e., oligomers) for use in this invention and having the general formula, alkyl—S(O)—(acrylic acid)$_b$—H or alkyl—S—(O)$_2$—(acrylic acid)$_b$—H, were prepared in methanol using ammonium persulfate as the initiator and were oxidized with hydrogen peroxide after the methanol had been distilled off and replaced with water.

The general procedure employed was to add acrylic acid, alkyl mercaptan, and methanol solvent to a reaction flask which was immersed in a thermostatted water bath and equipped with an addition funnel, a thermometer, an agitator, a water-cooled condenser and a nitrogen inlet. The solution was agitated, the nitrogen flow was commenced, and the contents of the flask was heated. When the desired reaction temperature, in this example 29° C., was reached, a solution of the initiator in methanol was introduced at a controlled rate into the flask via the addition funnel. The reaction is exothermic, so that the temperature of the reacting system rises above that of the bath. When the reaction is complete, there is no difference between the temperatures of the reactants and the bath. The reaction system was then transferred to a distillation assembly which could be operated at reduced pressure and was equipped with a steam jet leading to the liquid phase of the distillation vessel. Water was added to the reaction system, the vessel was heated with external steam, and vacuum was applied. This caused methanol to appear in the distillation receiver. When this distillation had stopped the system was returned to atmospheric pressure and steam was introduced into the reactor through the jet. This caused water with traces of methanol to distill off as the temperature reached 100° C. The reaction system was cooled to about 50° C. and a mole of hydrogen peroxide, as a 30% aqueous solution, was added for each gram-atom of sulfur in the material. This addition of $H_2O_2$ which reacted to form the product, alkyl—S(O)—(acrylic acid)$_b$—H, was effected slowly so that the resulting exotherm did not exceed a temperature increase of 15° C. The system was kept at 60° C. for about one hour after the completion of the addition of the hydrogen peroxide, and was then cooled to room temperature. To maintain homogeneity of this aqueous solution of the oligomer at room temperature, it was necessary, in some cases, to neutralize some of the acid groups with potassium hydroxide or other basic material such as sodium hydroxide or ammonia. The product was converted to alkyl—S(O)$_2$—(acrylic acid)$_b$—H by adding another mole of hydrogen peroxide for each gram-atom of sulfur and heating at 90–100° C. for about an hour.

Preparation of n-octyl—S(O)—[CH$_2$—CH(COOH]$_3$—H

The following materials were added to the reaction flask:

288 g. (4.0 moles) acrylic acid
194.7 g. (1.33 moles) n-octyl mercaptan
207 g. methanol Following the procedure previously described, the reaction was initiated at the reaction temperature by introducing a 0.8% $(NH_4)_2S_2O_8$/methanol solution at a rate of 7.4 g./hour. The reaction temperature reached 35° C. during the first 3.5 hours and gradually returned to the bath temperature. After 6 hours the addition of initiator solution was stopped. The reaction system was slightly hazy but fluid. Solids determination showed 99.1% conversion of reactants to product.

Of this reaction system, 93.3% was transferred to the distillation vessel and methanol was removed following the previously described procedure. The product was cooled and 109 g. of 36.1% hydrogen peroxide were added. One hour after the exotherm was over, sufficient 20% KOH was added to neutralize 5% of the acid groups. The product was a clear solution with 31.4% solids.

EXAMPLE II

Low molecular weight polymers (i.e., oligomers) for use in this invention and having the general formula n-alkyl—S(O)$_c$—(acrylonitrile)$_a$—(acrylic acid)$_b$—H were prepared in methanol or isopropyl alcohol using ammonium persulfate or lauroyl peroxide as the initiator and were oxidized with hydrogen peroxide before or after the alcohol had been distilled off and replaced with water.

The general procedure was to add the acrylic acid, acrylonitrile, n-alkyl mercaptan and methanol to a flask which was immersed in a thermostatted water bath and equipped as described in Example I. The continuous addition of the ammonium persulfate initiator solution to cause the reaction to proceed and the concomitant changes in the temperature of the reaction system to the apparent completion of this oligomerization were also as described in Example I.

When lauroyl peroxide was used as the initiator, it was added dry to the reaction mixture, either all at one time or in a few increments. Usually the lauroyl peroxide was activated by the addition of N,N-dimethyl aniline. The reaction system was oxidized with hydrogen peroxide using one or two moles of hydrogen peroxide per gram-atom of sulfur, either before the methanol has been distilled off and replaced with water, but preferably this oxidation was effected after the distillation. The distillation assembly was as described in Example I, except that the internal jet could be raised so that a stream of air would impinge on the surface of the liquid in the pot.

Since the reaction system as well as the product were not soluble in water until some of the acid groups had been neutralized, enough aqueous KOH solution to neutralize at least 70% of the acid groups was added to the reaction system at the time of transfer to the still. The contents of the pot were heated and most of the methanol was removed, either by reducing the pressure or by drawing air over the surface of the liquid in the pot. However, ultimately steam was introduced into the liquid and this caused water and traces of methanol to appear in the receiver with the pot temperature reaching the boiling point of water. The liquid remaining in the pot was cooled to about 50° C. and enough aqueous hydrogen peroxide was added to oxidize each sulfide to sulfoxide. An exotherm was observed upon this addition and one hour after it had subsided, the product, which had 20–50% solids and was macroscopically homogeneous, was removed. The sulfoxide was converted to the sulfone by adding to the solution one mole of aqueous hydrogen peroxide for each gram-atom of sulfur and heating at about 90° C. for about one hour.

Preparation of n-octyl—S(O)—[CH$_2$CH(CN)]$_8$
—[CH$_2$CH(COOH)]$_8$—H and n-octyl—S(O)$_2$—[CH$_2$CH(CN)]$_8$
—[CH$_2$CH(COOH)]$_8$—H The following materials were added to the reaction flask:

216 g. (3 moles) acrylic acid
159 g. (3 moles) acrylonitrile
54.8 g. (0.375 moles) n-octyl mercaptan
61.5 g. methanol Following the procedure previously described the reaction was initiated at 28° C. by introducing 0.8%

$(NH_4)_2S_2O_8$ in methanol at such a rate that 119 g. had been added over 6.8 hours. The temperature of the reacting system was kept in the range of 33–38° C., but during the last 1.5 hours, the bath temperature was raised to 35° C. The resulting transparent yellowish liquid weighed 628.6 g. and showed 97.8% conversion by solids determination. 508.3 g. of this reaction product was transferred to the still and enough aqueous KOH solution was added to neutralize 72% of the acid groups. The methanol was removed, first by drawing air over the surface of the liquid and then by introducing steam into the liquid. When the specific gravity of the distillate had reached 0.994, it was evident that the methanol removal was complete. The pot residue now weighed 1460 g., was homogeneous, and contained 23.3% alkyl-sulfide terminated oligomer. A portion of this solution was diluted to 10% oligomer, which showed a pH of 5.7. By adding KOH to other portions and then diluting, 10% oligomer solutions were prepared at pH's of 6.0, 6.5, and 9.0. The sulfoxide and sulfone derivatives were prepared from these 10% solutions by adding the appropriate amount of hydrogen peroxide and heating with atmospheric steam for an hour. These oxidized product solutions were diluted to 8% oligomer.

EXAMPLE III

Low molecular weight polymers (i.e., oligomers) of the invention having the general formula

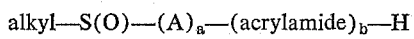

with (A) representing a polymerizable carboxylic acid, were prepared in isopropyl alcohol, lauroyl peroxide serving as the initiator, N,N-dimethyl aniline serving as the activator, to give as an intermediate a precipitate which was washed with alcohol, dried in an air stream, dissolved in water and oxidized by hydrogen peroxide. The apparatus used for the oligomerization was described in Example I. The product was a fine precipitate in this reaction system and was removed by filtration through paper. The retained precipitate was washed with isopropyl alcohol and dried by drawing air through it. For oxidation, the apparatus used for oligomerization was again employed. The dry powder was dissolved in water and placed in the reaction vessel. The solution reached equilibrium with the 50° C. bath and enough aqueous hydrogen peroxide was added to oxidize each sulfide linkage to sulfoxide. After cooling, the solution of the oligomer was ready for use.

Preparation of
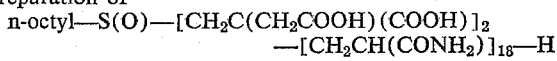

The following materials were added to the reaction flask:

512.2 g. (7.214 moles) acrylamide
104.2 g. (0.8015 mole) itaconic acid
58.5 g. (0.4008 mole) n-octyl mercaptan
12.0 g. lauroyl peroxide
2525 ml. isopropyl alcohol The flask was placed in a 37° C. thermostatted bath, such initial placement serving as the reference time. The reaction temperature was 35.2° C. at 35 minutes and 4 g. N,N-dimethyl aniline were added. At 90 minutes, the reaction temperature reached 41.0° C. and 19.6 g. (0.1344 mole) n-octyl mercaptan were added. The reaction temperature was 43.8° C. at 125 minutes and 6 g. lauroyl peroxide were added. N,N-dimethyl aniline (4 g.) was added at 145 minutes, when the contents of the flask were at 44.5° C. The reaction temperature peaked at 45.0° C. between 150–160 minutes, then fell continuously and reached 37.0° C. at 255 minutes, and did not change during the next thirty minutes. The reaction system was vacuum filtered through paper. The precipitate was slurried in methanol which had been heated to 60° C., and was then filtered again. The precipitate was washed with 700 ml. methanol and dried overnight by drawing air through it. The next day, the precipitate weighed 627 g. which indicated a 90% yield. Some of the product was dissolved in water with enough calcium hydroxide to neutralize half of the acid groups to thereby prepare a 10% aqueous solution which had a 52.7 d./cm. surface tension and thus was a surface active agent. The product (130.8 g.) was dissolved in 415 g. water and placed in an agitated flask in a 49.0° C. thermostatted bath. When the flask contents reached equilibrium with the bath, 7.54 g. 35% hydrogen peroxide was added and an exotherm of 0.7° C. was observed. After cooling, the solution contained 24.8% oligomer. The solution showed 41 d./cm. surface tension and 15 cps. viscosity.

EXAMPLE IV

Four latexes were prepared by emulsion polymerization of the systems shown in Table 1.

TABLE 1

| Latex designation | Parts by weight of— | | | Emulsifier structure | Amount, parts by weight |
|---|---|---|---|---|---|
| | Butadiene | Styrene | Itaconic acid | | |
| A | 40 | 59 | 1 | n-Octyl—S(O)—[CH$_2$—CH(CN)]$_8$—[CH$_2$—CH(COOK)]$_8$—H | 5 |
| B | 40 | 59 | 1 | n-Octyl—S(O)—[CH$_2$—C(COOH) (CH$_2$COOH)]$_2$—[(CH$_2$—CH(CONH$_2$)]$_{18}$—H | 5 |
| C* | 40 | 59 | 1 | n-Octyl—S(O)—[CH$_2$—CH(COOH)]$_3$—H | 5 |
| D | 40 | 59 | 1 | n-Octyl—S(O)$_2$—[CH$_2$—CH(CN)]$_8$—[CH$_2$—CH(COOK)]$_8$—H | 4.1 |

* Latex C had only 1% of the acid groups neutralized with potassium hydroxide.

The pH of the latexes was raised before and after stripping to remove residual monomer.

The emulsion properties of the latexes are tabulated in Table 2.

TABLE 2

| Latex designation | A | B | C | D |
|---|---|---|---|---|
| Percent solids | 49.8 | 50.7 | 50.3 | 54.9 |
| pH | 9.4 | 9.2 | 9.1 | 9.0 |
| Surface tension, d./cm | 76 | 80 | 63 | 71 |
| Brookfield viscosity, cps | 220 | 300 | 40 | |
| Turbidity | 1.3 | 1.2 | 0.8 | 1.4 |

Table 2 shows that latexes prepared using the emulsifiers heretofore described have properties which render them completely suitable for the contemplated end use. The high surface tension of the latexes indicated that they have minimal foaming tendency, which was confirmed by observation.

EXAMPLE V

Carpet backing compositions described in Table 3 were prepared. Latex E was polymerized on the same monomer systems as latexes A, B, C and D, except that the emulsifier was the sodium salt of linear dodecylbenzene sulfonate.

TABLE 3.—CARPET BACKING COMPOSITIONS

| Ingredients | Dry weight, parts | | |
|---|---|---|---|
| Latex designation | A, B, C | D | E |
| Latex, parts | 100 | 100 | 100 |
| Calcium carbonate | 300 | 300 | 300 |
| Tetrapotassium pyrophosphate | 0.5 | 1.0 | 0.75 |
| Sodium salt of condensed naphthalene sulfonate | 2.0 | 2.0 | 0.75 |
| Alkylated cresol antioxidant ("Wing-Stay L" Goodyear Tire and Rubber Co.) | 1.0 | 1.0 | 1.0 |
| Sodium orthophenylphenate | None | 0.25 | 0.25 |
| Defoamer, non-silicone type (Nopco 8034) | None | None | 0.3 |

The compositions of Table 3 were thickened with sodium polyacrylate and diluted with water, in such amounts that they ultimately reached 68% solids and about 8000 cps. viscosity (#4 spindle at 10 r.p.m. on the Brookfield viscometer).

To demonstrate the outstanding "quick set" and ultimate adhesion properties of these coating compositions, samples of nylon tufted carpet were coated with weighed amounts of latex to give a known weight of dry compound per square yard. The secondary jute backing fabric was applied on this latex layer and rolled down with light pressure. The laminate was put into an oven at 260–300° F. for short intervals. The samples were removed and the secondary backing immediately stripped off using a modified Scott tensile tester, to obtain an average adhesion value, recorded as lbs. per 3 inch wide strip. After 3 minute and 6 minute drying intervals, the latex compounds contained 75 and 50%, respectively, of the original water in the coating composition, i.e., they were still a long way from being dried out. Samples were also dried for 20 minutes, after which time they were essentially free of the original water, and the average adhesion value of such samples was designated as the ultimate adhesion. The quick-set and ultimate adhesion results for carpet coated with the compositions of Table 3 are presented in Table 4.

TABLE 4.—CARPET ADHESION VALUES

| Latex | A | B | C | D | E |
|---|---|---|---|---|---|
| Quick-set, grams/1" strip: | | | | | |
| 3 minutes | | 50 | 66 | 100 | 83 |
| 6 minutes | | 258 | 266 | 316 | 133 |
| Ultimate adhesion, #/3" strip | 15 | 17.5 | 17.5 | 15 | 5.5 |

These results show that the coating compositions of the instant invention, yield superior results for carpet adhesion, as shown by the six minute quick-set and ultimate adhesion values.

EXAMPLE VI

As previously pointed out, a major problem with latex coating compositions prepared from conventional emulsifiers, is that they have relatively low surface tensions (generally about 30–45 dynes/cm.), and consequently wet a jute fabric too readily. Moreover, there is no convenient or inexpensive way to decrease or control the wetting properties thereof. The coating compositions of my invention, however, will not wet 9 oz. jute fabric even if the compound is diluted to a lower solids content. Furthermore, the wetting properties of my coating compositions can be controlled, i.e., increased, by adding small amounts of surfactants such as, e.g., salts of alkyl aryl sulfonates, to the coating composition. The effect of adding a surfactant on surface tension and ultimate adhesion of the composition of Table 3 in Example V is shown by the results tabulated in Table 5.

TABLE 5.—EFFECT OF ADDED SURFACTANT

| Latex | Added alkyl aryl sulfonate[1] | Surface tension, d./cm. | Ultimate adhesion, #/3" strip |
|---|---|---|---|
| A | 0 | 70 | 15 |
| | 2 | 48.5 | 12 |
| | 3 | 42 | 8 |
| | 4 | 33.5 | 5 |

As seen from Table 5, the addition of up to three parts of the surfactant did not significantly affect adhesion (as determined by the Scott Tensile tester described in Example V). Since reliable surface tension data cannot be obtained on the loaded and thickened coating composition, the above surface tensions were measured prior to the addition of the filler and thickener. Control of wettability can also be achieved by blending the coating compositions of the invention with conventionally emulsified latexes.

Having thus described my invention, what I claim and desire to protect by Letters Patent is:

1. A coating composition which comprises a stabilized latex containing, in admixture therewith, from 0.2 to 10 parts of a stabilizer (based on 100 parts of dry latex) selected from the group consisting of alkali metal polyphosphates, alkali metal silicates, condensation products of formaldehyde with naphthalene sulfonic acid, and alkali metal salts of polymerized carboxylic acids, an inert filler and an oligomer having the formula:

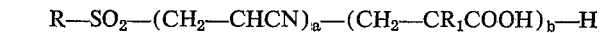

wherein R is an alkyl group having from 6 to 12 carbon atoms; $R_1$ is hydrogen or methyl; $a+b$ is from 4 to 50 and $a/a+b$ is from 0 to 0.6; said oligomer being present in the form of a water soluble salt selected from the group consisting of the ammonium, lower alkyl, alkanol substituted ammonium, and alkali metal salts thereof.

2. The coating composition of claim 1 wherein R is a primary or secondary alkyl group.

3. The coating composition of claim 1 wherein R is a normal alkyl group having from 7 to 11 carbon atoms; $a+b$ is from 12 to 30; and $a/a+b$ is from 0.2 to 0.55.

4. The coating composition of claim 1 wherein said latex is an addition polymer of a monomeric material selected from the group consisting of butadiene, butadiene-styrene, butadiene-acrylonitrile, butadiene-vinylidene chloride, butadiene-methacrylonitrile, styrene-acrylonitrile, styrene-methacrylonitrile, ethyl acrylate, ethyl acrylate-vinyl acetate, ethyl acrylate-methyl methacrylate, ethyl acrylate-styrene, ethyl acrylate-butyl acrylate, and butyl acrylate-acrylonitrile.

5. The coating composition of claim 4 wherein the monomeric material is butadiene and styrene.

6. The coating composition of claim 1 wherein said latex is carboxylated with from 0.5 to 5% of a carboxyl component (based on the polymerized monomer).

7. The coating composition of claim 6 wherein said latex is a carboxylated butadiene-styrene latex.

8. A coating composition which comprises a stabilized latex containing, in admixture therewith, from 0.2 to 10 parts of a stabilizer (based on 100 parts of dry latex) selected from the group consisting of alkali metal polyphosphates, alkali metal silicates, condensation products of formaldehyde with naphthalene sulfonic acid, and alkali metal salts of polymerized carboxylic acids, an inert filler and an oligomer having the formula:

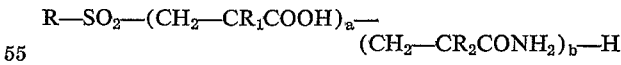

wherein R is an alkyl group having from 7 to 12 carbon atoms; $R_2$ is hydrogen or methyl; $R_1$ is hydrogen, methyl or —$CH_2COOH$; $a+b$ is 6 to 50 and $a/a+b$ is from 0.075 to 0.4; said oligomer being present in the acid form or in the form of a water soluble salt selected from the group consisting of the ammonium, lower alkyl, alkanol substituted ammonium, and alkali metal salts thereof.

9. The coating composition of claim 8 wherein R is a primary or secondary alkyl group.

10. The coating composition of claim 8 wherein R is a normal alkyl group having from 8 to 10 carbon atoms; $R_1$ is hydrogen or —$CH_2$—COOH $a+b$ is from 12 to 30; and $a/a+b$ is from 0.075 to 0.15.

11. The coating composition of claim 8 wherein said latex is an addition polymer of a monomeric material selected from the group consisting of butadiene, butadiene-styrene, butadiene-acrylonitrile, butadiene-vinylidene chloride, butadiene-methacrylonitrile, styrene-acrylonitrile, styrene-methacrylonitrile, ethyl acrylate, ethyl acrylate-vinyl acetate, ethylacrylate-methyl methacrylate, ethyl acrylate-styrene, ethyl acrylate-butyl acrylate, and butyl acrylate-acrylonitrile.

12. The coating composition of claim 11 wherein the monomeric material is butadiene and styrene.

13. The coating composition of claim 8 wherein said latex is carboxylated with from 0.5 to 5% of a carboxyl component (based on the polymerized monomer).

14. The coating composition of claim 13 wherein said latex is a carboxylated butadiene-styrene latex.

References Cited
UNITED STATES PATENTS
3,355,482  11/1967  Coover et al. _____ 260—464

MORRIS LIEBMAN, Primary Examiner

T. DE BENEDICTIS, SR., Assistant Examiner

U.S. Cl. X.R.

260—29.6 WB, RW, MP, MQ, MN, 29.7 H, P, N, W, 78.5 N, BB, 79.3 A, 79.7 85.5 AM